United States Patent [19]
Piccolo et al.

[11] 3,818,197
[45] June 18, 1974

[54] COMPUTERIZED SPECTROMETER SYSTEM

[75] Inventors: Adrian Piccolo, Brighton; Arthur Turner, Carlisle, both of Mass.

[73] Assignee: Baird-Atomic Inc., Bedford, Mass.

[22] Filed: June 2, 1972

[21] Appl. No.: 259,152

Related U.S. Application Data

[63] Continuation-in-part of Ser. No. 55,429, July 16, 1970.

[52] U.S. Cl. ................................ 235/151.3, 356/81
[51] Int. Cl. ..... G06f 15/06, G06f 15/20, G01j 3/36
[58] Field of Search ............ 235/151.3; 356/74, 98, 356/81, 82, 99; 250/41.9

[56] References Cited

UNITED STATES PATENTS 3,531,202 9/1970 Wilkinson et al. ................ 356/98 X
3,547,541 12/1970 Varnela ............................... 356/81

*Primary Examiner*—Malcolm A. Morrison
*Assistant Examiner*—Edward J. Wise
*Attorney, Agent, or Firm*—Morse, Altman, Oates & Bello

[57] ABSTRACT

A system for calculating, analyzing and presenting a chemical analysis of a specimen is comprised of a spectrometer, a converter-control, a computer, programmers, a keyboard, and a display. The format of the presented data the calculation of the specimen data and the analysis of the calculated data are specified by a combination of interrogating signals from the programmers and responsive signals from the keyboard.

9 Claims, 9 Drawing Figures

| INTERROGATING SIGNALS | RESPONSIVE SIGNALS |
|---|---|
| | start |
| LN.Ø1 NO. OF F.D. CHARS. | 1Ø |
| LN.Ø2 NO. OF ELEMENTS | 23 |
| LN.Ø3 NO. OF ALLOYS | 4 |
| LN.Ø4 TIME CONSTANT | 1275 |
| | REJECT |
| LN.Ø1 NO. OF F.D. CHARS. | 1Ø |
| LN.Ø2 NO. OF ELEMENTS | 33 |
| LN.Ø3 NO. OF ALLOYS | 4 |
| LN.Ø4 TIME CONSTANT | 1275 |
| | CORRECT |
| LN. NO. ? | 2 |
| LN.Ø2 NO. OF ELEMENTS | 23 |
| | CORRECT |
| LN. NO. ? | 3 |
| LN. NO. Ø3 NO. OF ALLOYS | 3 |
| | ACCEPT |

FIG. 2

| INTERROGATING SIGNALS | RESPONSIVE SIGNALS | NOTES |
|---|---|---|
| | FORMAT | |
| ALLOY? | 1 | |
| | EL. SEQ. IN BK | |
| SUP. SYMBOL? | N | |
| SUP. ELEMENT? | N | Format |
| TAB? | N | BK X. XX |
| LEVEL | 5 | |
| TOTAL NO. OF DIGITS? | 3 | |
| DIGITS AFTER DEC. PT.? | 2 | |
| | ACCEPT | |
| | EL. SEQ. IN CU | |
| SUP. SYMBOL? | N | |
| SUP. ELEMENT? | N | Format |
| TAB? | N | CU XXX. XX |
| LEVEL? | 5 | |
| TOTAL NO. OF DIGITS? | 5 | |
| DIGITS AFTER DEC. PT.? | 2 | |
| | ACCEPT | |
| | EL. SEQ. IN C | |
| SUP. SYMBOL? | N | |
| SUP. ELEMENT? | N | Format |
| TAB? | N | C X. XXX |
| LEVEL? | 1 | |
| TOTAL NO. OF DIGITS? | 4 | |
| DIGITS AFTER DEC. PT.? | 3 | |
| | ACCEPT | |
| INTERFERENCE | CORRECTIONS | |
| ALLOY? | 1 | |
| NO. OF CORRECTIONS? | 2 | |
| CHANNEL INFLUENCED? | 3 | |
| BY CHANNEL? | 4 | |
| CORRECTION? | Ø.ØØ25 | |
| BY CHANNEL? | 5 | |
| CORRECTION? | Ø.Ø | no correction |
| BY CHANNEL? | 9 | |
| CORRECTION? | Ø.Ø | no correction |
| CHANNEL INFLUENCED? | 6 | |
| BY CHANNEL? | 8 | |
| CORRECTION? | Ø.ØØØ75 | |
| BY CHANNEL? | 5 | |
| CORRECTION? | Ø.Ø33 | |
| BY CHANNEL? | 7 | |
| CORRECTION? | Ø.Ø | no correction |

FIG. 3

| INTERROGATING SIGNALS | | RESPONSIVE SIGNALS |
|---|---|---|
| | identification | |
| | | CALIBRATE |
| ALLOY ? | | 1 |
| CHANNEL ? | | 6 |
| NUMBER OF SAMPLES ? | | 4 |
| FOR BACKGROUND ? | | 2 |
| STANDARD CLOCK READING ? | | 2822X |
| | operator use of alpha character correction | |
| ? ? | | 2820 |
| STANDARD NUMBER ? | | 2 |
| | | ACCEPT |
| | Data | |
| ELEMENT FOR CALIBRATION IS -B- | | |
| *0001 SAMPLE NUMBER ? | | 1 |
| *0002 ELEMENT PERCENT ? | | .0002 |
| *0003 REFERENCE PERCENT ? | | 97.2 |
| *0004 CLOCK READING ? | | 3840 |
| *0005 BACKGROUND READING ? | | 1852 |
| *0006 SAMPLE NUMBER ? | | 2 |
| *0007 ELEMENT PERCENT ? | | .0005 |
| *0008 REFERENCE PERCENT ? | | 96.0 |
| *0009 CLOCK READING ? | | 3735 |
| *0010 BACKGROUND READING ? | | 1845 |
| *0011 SAMPLE NUMBER ? | | 4X |
| | operator use of alpha character correction | |
| ? ? | | 3 |
| *0012 ELEMENT PERCENT ? | | .0055 |
| *0013 REFERENCE PERCENT ? | | 99.05 |
| *0014 CLOCK READING ? | | 2788 |
| *0015 BACKGROUND READING ? | | 1911 |
| *0016 SAMPLE NUMBER ? | | 4 |
| *0017 ELEMENT PERCENT ? | | .009 |
| *0018 REFERENCE PERCENT ? | | 96.7 |
| *0019 CLOCK READING ? | | 2390 |
| *0020 BACKGROUND READING ? | | 1843 |
| | operator use of CORRECT command | CORRECT |
| LN. NO. ? | | 13 |
| *0013 REFERENCE PERCENT ? | | 99.5 |
| | | ACCEPT |
| | Evaluation | |
| NUMBER OF COEFFICIENTS ? | | 2 |
| | computer prints out values, waits for operator command: ACCEPT, CORRECT, REJECT | |

| A = | B = | C = | D = |
|---|---|---|---|
| +0.0000000E+00 | +0.4804865E-03 | +0.7576812E-03 | +0.1553839E-03 |

| SAM* | TRUE PERCENT | CALC PERCENT | DIFFERENCE | PCT. ERROR |
|---|---|---|---|---|
| *0001 | +0.2000000E-03 | +0.1983756E-03 | +0.1624313E-05 | +0.8121566E+00 |
| *0002 | +0.5000000E-03 | +0.5087685E-03 | -0.8768516E-05 | -0.1753703E+00 |
| *0003 | +0.5499999E-02 | +0.5622662E-02 | -0.1226635E-03 | -0.2230246E+00 |
| *0004 | +0.8999998E-02 | +0.8810338E-02 | +0.1896601E-03 | +0.2107335E+00 |

| | | |
|---|---|---|
| | | CORRECT |
| | operator use of CORRECT option to attempt a better curve | |
| NUMBER OF SAMPLES ? | | 4 |
| FOR BACKGROUND ? | | 2 |
| NO. OF COEFFICIENTS ? | | 3 |

FIG. 4

PERCENT CONCENTRATION OUTPUT

AA 2912177EXPS 1

| | | | | | |
|---|---|---|---|---|---|
| BK .245 | CV 96.84 | C .498 | MN 1.34Ø | P .Ø16 | S .Ø23 |
| SI .516 | | | | | |

EXPS 2

| | | | | | |
|---|---|---|---|---|---|
| BK .245 | CV 96.84 | C .491 | MN 1.348 | P .Ø16 | S .Ø22 |
| SI .522 | | | | | |

AA 2912177AVE 1, 2,

| | | | | | |
|---|---|---|---|---|---|
| BK .245 | CV 96.84 | C .494 | MN 1.344 | P .Ø16 | S .Ø22 |
| SI .519 | | | | | |

CA 2912177EXPS 1

| | | | | | |
|---|---|---|---|---|---|
| BK .249 | CV 96.75 | C .497 | MN 1.376 | P .Ø28 | S .Ø23 |
| SI .533 | CR .Ø73 | NI .136 | MO .Ø24 | CU .1Ø4 | V .3Ø2 |
| TI .ØØ5 | NB .Ø43 | AL .ØØ9 | B .ØØ46 | SN .Ø44 | PB .ØØ4 |
| CO .Ø3Ø | ZR .Ø12 | | | | |

EXPS 2

| | | | | | |
|---|---|---|---|---|---|
| BK .245 | CV 96.72 | C .499 | MN 1.398 | P .Ø28 | S .Ø24 |
| SI .538 | CR .Ø73 | NI .135 | MO .Ø24 | CU .1Ø3 | V .3Ø5 |
| TI .ØØ5 | NB .Ø45 | AL .ØØ8 | B .ØØ45 | SN .Ø46 | PB .ØØ4 |
| CO .Ø29 | ZR .Ø12 | | | | |

CA 2912177AVE 1, 2,

| | | | | | |
|---|---|---|---|---|---|
| BK .247 | CV 96.74 | C .498 | MN 1.387 | P .Ø28 | S .Ø24 |
| SI .536 | CR .Ø73 | NI .136 | MO .Ø24 | CU .1Ø3 | V .3Ø4 |
| TI .ØØ5 | NB .Ø44 | AL .ØØ8 | B .ØØ45 | SN .Ø45 | PB .ØØ4 |
| CO .Ø3Ø | ZR .Ø12 | | | | |

FIG. 5

COMPUTERIZED SPECTROMETER SYSTEM

RELATED APPLICATION

The present application is a continuation-in-part of application Ser. No. 55,429, filed July 16, 1970 for a Computerized Spectrometer System in the names of the applicants hereof.

BACKGROUND OF THE INVENTION

1. Field of Invention

The invention relates to computer controlled systems and more particularly to a computerized spectrometer system which is keyboard controllable.

2. Description of the Prior Art

Spectrometer systems are well known in the art as a means for presenting a chemical analysis of a specimen. In analogous computerized systems, raw data is recorded on a magnetic tape in response to a preprogrammed sequence and the recorded data is fed into a computer for analysis. Due to the fact that errors in the recorded data and/or in the tape itself are not discovered until after the data has been analyzed, such analogous systems have suffered from inefficiency.

SUMMARY OF THE INVENTION

An object of this invention is to provide an efficient computerized direct reading optical emission spectrometer system in which a computer, under the control of an unskilled operator, is used for real-time data reduction. The system is characterized by a spectrometer, a converter-control, a computer, programmers, a keyboard, and a display. Analog signals as at the output of the spectrometer are converted to an analytical curve of specimen concentration versus the logarithm of the ratio of specimen voltage to reference voltage in the converter-control. The coefficients of a polynomial equation defining the analytical curve are calculated by a least-mean-square error fit and stored in the computer. The stored data is analyzed in the computer and is presented by the display. The format of the presented data, the calibration of the specimen data and the analysis of the calibrated data is governed by a series of interrogating signals and a series of responsive signals which are generated by the programmers and the keyboard, respectively. The combination of spectrometer, converter-control, computer, programmers, keyboard, and display is such as to provide an expeditious computerized spectrometer system.

Another object of the invention is to provide a method of determining from the spectra of spectral analysis the elements of a specimen by generating a physical representation of an analytical curve defining the coefficients of a polynomial equation representing the trace elements of the specimen; feeding the physical representations into a computer; generating a series of interrogating signals; generating a series of signals responsive to the interrogating signal, the responsive signals being stored in the computer; and presenting the specimen data stored in the computer in a manner specified by the responsive signals.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein:

FIG. 2 is a diagram illustrating certain principles of the system of FIG. 1;

FIG. 3 is a diagram illustrating a FORMAT of data for the system of FIG. 1;

FIG. 4 is a diagram illustrating the CALIBRATE mode for the system of FIG. 1;

FIG. 5 is a diagram illustrating percent concentration output for the systems of FIG. 1;

DETAILED DESCRIPTION OF THE PREFERRED EMBODIMENT

Figure 1:
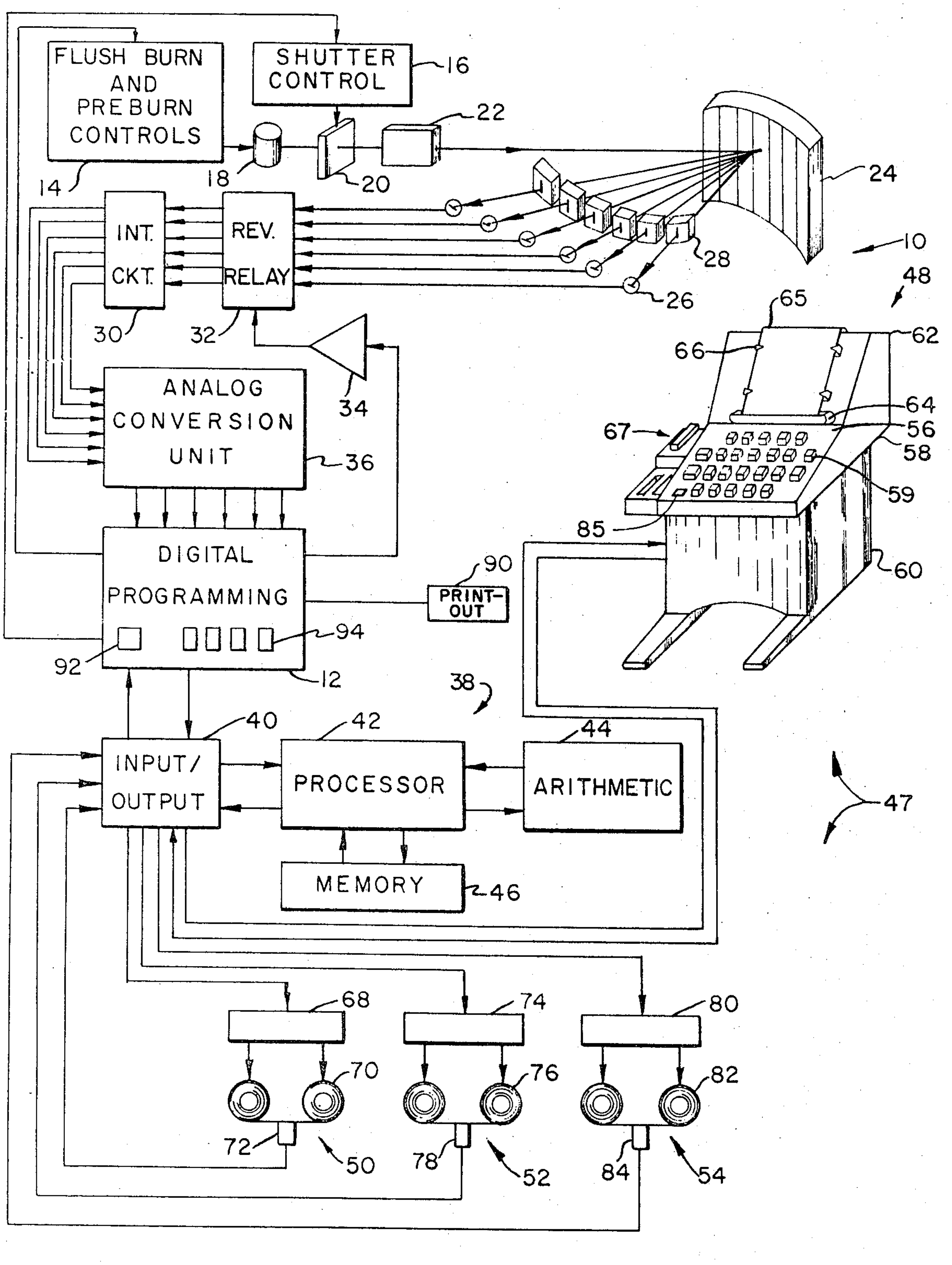
FIG. 1 is a block and schematic diagram, somewhat perspective of a spectrometer system embodying the invention.

Referring now to FIG. 1, there is shown a spectrometer 10 which is controlled by a digital programmer 12. Signals at the output of digital programmer 12 are applied to a burn control 14 and a shutter control 16 of spectrometer 10 for exciting a specimen 18 and governing the position of a shutter 20, respectively. The light emitted from specimen 18 is directed through shutter 20 and an entrance slit 22 toward a diffraction grating 24. The dispersed light or spectrum from grating 24 is directed toward a plurality of photo detectors 26 via a plurality of arcuately distributed exit slits 28, each of the photo detectors being in register with each of the exit slits, respectively. The signal as at the output of each of photo detectors 26 is applied to an integrating circuit 30, for example integrating capacitors, via reversing relays 32. Control signals generated by digital programmer 12 are applied to reversing relays 32 via a driver 34 for control thereof. The signals as at the output of integrating capacitors 30 are applied to digital programmer 12 via an analog to digital conversion unit 36. In the illustrated embodiment, one of the exit slits, one photo detector and one integrating capacitor are used as a reference.

The spectrometer system embodying the present invention reduces data from spectrometer 10 in real-time. These data appear as voltages on integrating capacitors 30 and are converted to the concentrations of trace elements in specimen 18 by weight percent. The conversion is accomplished by using a polynomial equation relating the raw data points to concentration.

As shown in FIG. 1, diffraction grating 24, for example a concave diffraction grating, disperses the light from excited specimen 18 into its various wavelengths. The light at a wavelength characteristic of a specific trace element of specimen 18 illuminates a specific photo-conductor, whereby a signal is produced which is integrated by capacitors 30. Simultaneously the reference capacitor is charged to a reference voltage representative of the amount of material analyzed by spectrometer 10. As previously stated, the signals as at the output of integrating circuits 30 input digital conversion unit 36. The signals at the output of analog to digital conversion unit 36 represent the logarithm of the ratio of the trace element and reference voltages.

This technique is disclosed in the copending application in the name of H. Wilkinson and P. Spergel, Ser. No. 593,796, filed Nov. 14, 1966, for a Spectrometer Readout, now Pat. No. 3,531,202, which is assigned to the assignee of this application. The advantages of this technique stem from the fact that system gain changes appear as a pure translation of the analytical working curve plotted as trace element concentration versus the logarithm of the ratio of trace element voltage to reference voltage. Since the shape of the analytical curve is invariant, coefficients of the polynomial equation defining the curve may be determined by a least-mean-square error fit and stored in a computer 38.

Computer 38, which controls the operation of digital programmer 12, is comprised of an input/output 40, a processor 42, an arithmetic unit 44 and a memory 46. Computer 38 receives input command signals from a variable programmer 47 which includes a control 48 and programmers 50, 52 and 54.

In the preferred embodiment, control 48 is a teletype unit which includes a switch matrix 56, for example a keyboard having a plurality of keys 59, each of the keys being identified by a distinct intelligence symbol, for example, an alphanumeric character. As shown in FIG. 1, keyboard 56 is mounted on a platform 58 which is affixed to a base 60, a substantially upright member 62 being affixed to the rearward side of platform 58. A carriage 64 is rotatably mounted to teletype unit 48 and a web 65, for example paper, is advanced from a supply (not shown) as carriage 64 is rotated, paper 65 being slidably held in juxtaposition with member 62 by guides 66. A tape printer and reader 67 is mounted to teletype unit 48 at one side thereof. Command signals generated from keyboard 56 in response to an operator selectively energizing keys 59 are applied selectively to programmers 50, 52 and 54 via computer 38.

Programmer 50 includes a driver 68 which is operatively connected to a memory core 70, for example a paper tape, and a sensor 72 which electrically communicates with paper tape 70 and input/output 40. In the preferred embodiment of the invention, each of programmers 50, 52 and 54 is comprised of like parts. Programmer 52 includes a driver 74, a memory core 76 and a sensor 78; programmer 54 includes a driver 80, a memory core 82 and a sensor 84. It will be appreciated that, while each of programmers 50, 52 and 54 is comprised of like parts, each of the memory cores is adapted for storage of independent data. That is, the data stored in any one of the memory cores may be different from the data stored in any other of the memory cores. In the following discussion, programmers 50, 52 and 54 will be referred to as FORMAT, CALIBRATE and ANALYSIS, respectively. It is to be understood that, in alternative embodiments, the number of programmers is other than three, for example, one or four.

FORMAT programmer 50 and CALIBRATE programmer 52 provide the constants necessary for operation of the system while under the control of ANALYSIS programmer 54. FORMAT programmer 50 is used to set up initial conditions for CALIBRATE and ANALYSIS programmers 52 and 54, respectively. CALIBRATE programmer 52 is used to calibrate the equation for the analytical curve using either a second or third order equation for fitting the analytical curve. ANALYSIS programmer 54 receives, checks and reduces specimen data from spectrometer 10 and performs operations such as percent concentration calculations, standardization, and scaler output of raw spectrometer data.

As previously indicated, the operator controls the system by selectively energizing keys 59. As each key 59 is depressed, the alphanumeric character associated therewith is printed on paper 65 and a command signal representative of the depressed key is applied to memory 46 via input/output 40 and processor 42. In one example, computer 38, in response to the command signals as at the output of teletype unit 48, generates command signals to driver 68, in consequence interrogating signals representing question data stored in paper tape 70 are applied to memory 46 via sensor 72, input/output 40 and processor 42. The interrogating signals are applied to teletype unit 48 via computer 38, whereby keys 59 are selectively energized and alphanumeric characters representing the interrogating signals are printed on paper 65. Thereafter, the operator selectively energizes keys 59, whereby alphanumeric characters are printed on paper 65. In addition, a series of responsive signals, from teletype 48 are applied to computer 38 for storage in memory 46. The operator then depresses a carriage return key 85, in consequence carriage 64 is advanced one line. Thereafter, depending upon the responsive signal initiated by the operator, preprogrammed interrogating signals are applied to computer 38 and the cycle continues. It is to be understood that, by selectively energizing keys 59, the operator is able to elicit interrogating signals representing questions data from each of programmers 50, 52, and 54.

As hereinafter described, the data stored in memory 46 is applied to digital programmer 12 for control of spectrometer 10. The data stored in memory 46 is applied to digital programmer 12 at such time that the proper command signal is generated from teletype unit 48 in response the operator energizing keys 59 in a selected sequence.

Figures 6, 7:
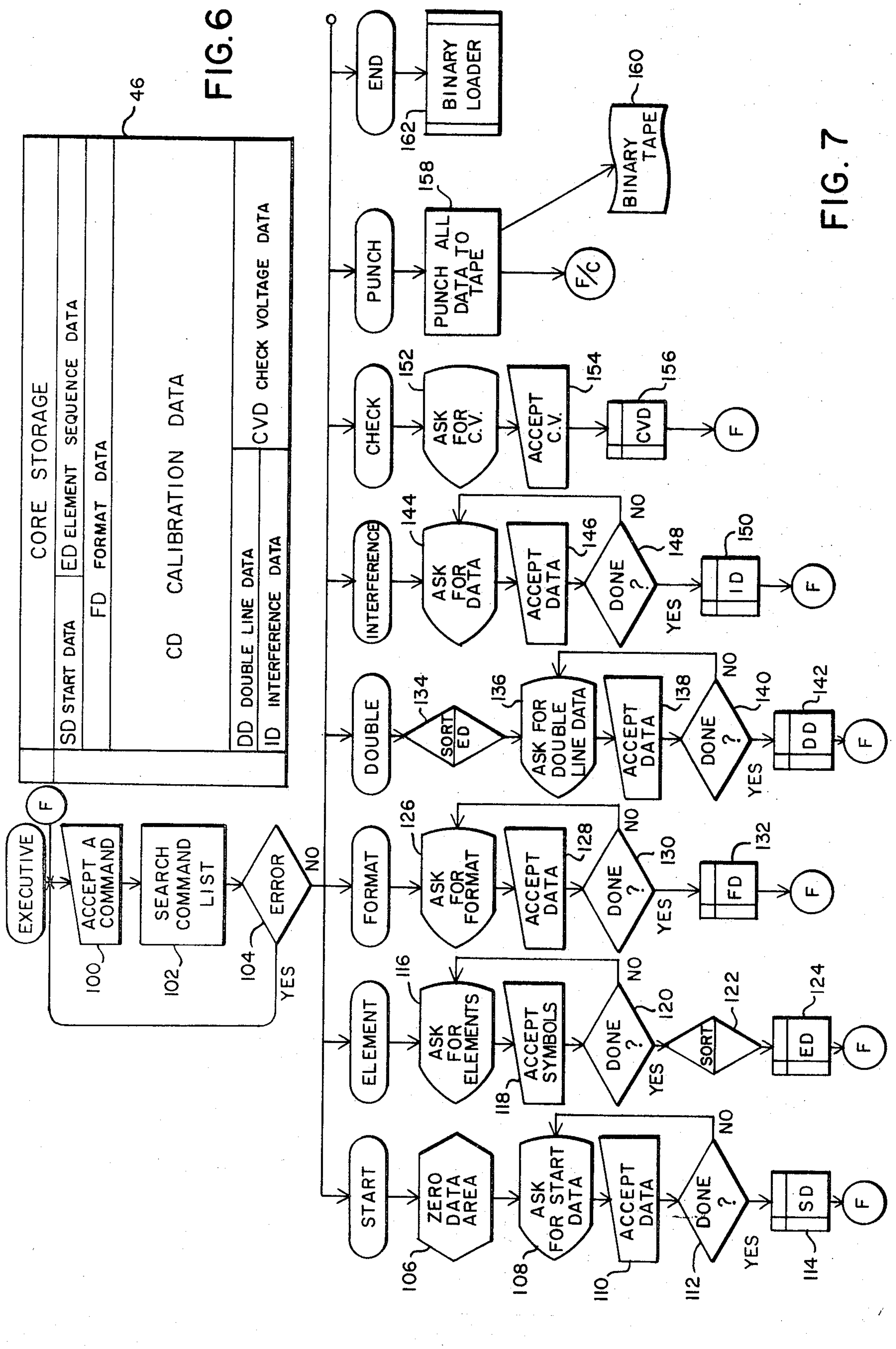
FIG. 6 is a diagram illustrating the data stored in the computer of FIG. 1.
FIG. 7 is a flow chart of the FORMAT program.
Figure 8:
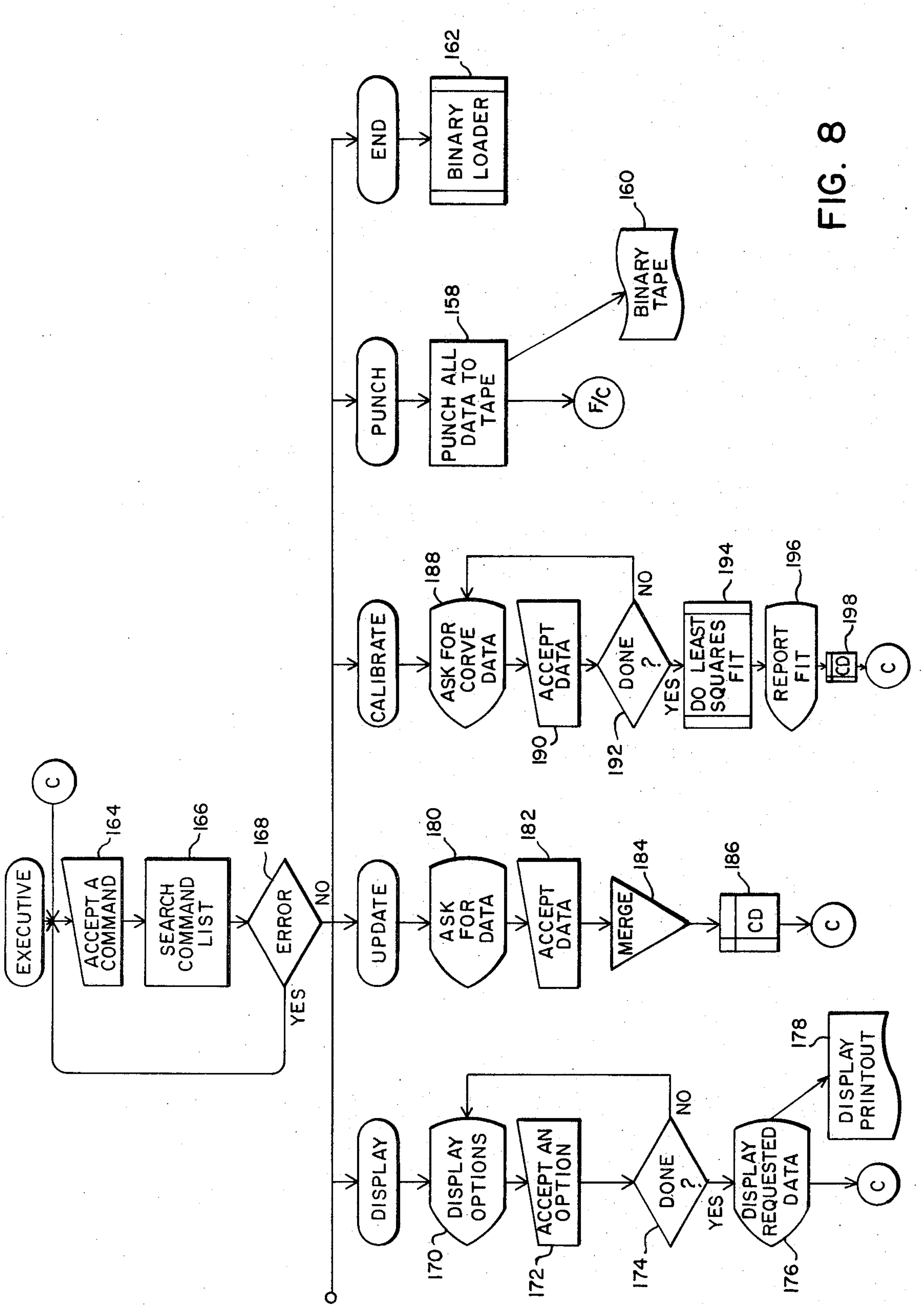
FIG. 8 is a flow chart of the CALIBRATE program.
Figure 9:
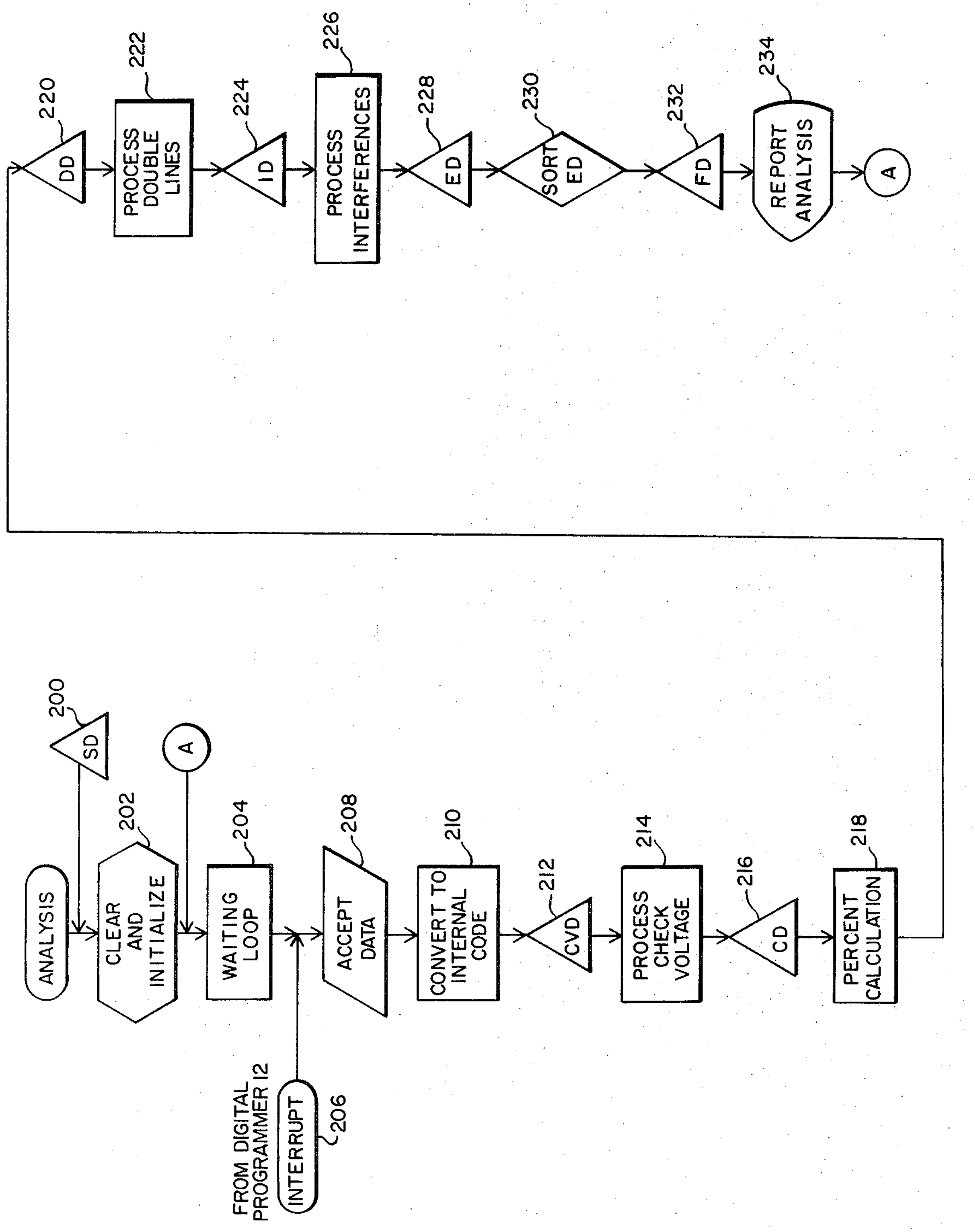
FIG. 9 is a flow chart of the ANALYSIS program.

By way of example, in order to facilitate a fuller understanding of the present invention, the FORMAT, CALIBRATE, and ANALYSIS modes of operation will be discussed separately, reference being made to the flow charts of FORMAT programmer 50 (FIG. 7), CALIBRATE programmer 52 (FIG. 8) and ANALYSIS programmer 54 (FIG. 9). The interrelationship among programmers 50, 52, and 54 and memory 46 is shown in FIG. 6. The symbols presented in FIGS. 7, 8 and 9 conform to the International Organization for Standardization Recommendation on Flowchart Symbols for Information Processing. In the following description, two types of command signals are used for data transmission between teletype 48 and computer 38, and among programmers 50, 52, 54 and computer 38. These command signals are designated primary command signals and secondary command signals. The primary command signals initiate a primary operation and the secondary command signals serve as an editing tool within the primary operation.

FORMAT PROGRAM FLOW CHART

Referring now to FIG. 7, the operator selectively energizes keys 59 in such a manner that the command word START is printed on paper 65, ACCEPT A COMMAND 100, and a command list in computer 38 is searched, SEARCH COMMAND LIST 102. In the illustrated embodiment, by way of example, the command list is searched for the first two letters of the command word START. That is, the command list is searched for the letters ST. A decision, ERROR 104, is made as to whether or not the letters ST are on the command list. If there is an error, i.e. the letters ST are not on the command list, the sequence begins again with a new command word. If there is no error, i.e. the letters ST are on the command list, the sequence continues. The recognized and accepted command signal clears memory 46, ZERO DATA AREA 106, and paper tape 70 is advanced. In consequence, an interrogating signal, ASK FOR START DATA 108, representing data questions, is applied to teletype 48 via a computer 38. The operator selectively energizes keys 59 in such a manner as to enter responsive signals, ACCEPT DATA 110, into computer 38. Thereafter a decision DONE 112, is made as to whether or not there are additional interrogating signals. If there are additional interrogating signals, the next interrogating signal and its responsive signal are generated. When the interrogating and responsive signals for this portion of the program have been completed, START DATA FORMAT 114, (SD) is entered into memory 46.

In the next portion of the FORMAT program, the operator selectively energizes keys 59 in such a manner that the command word ELEMENT is printed on paper 65, ACCEPT A COMMAND 100, and the command list in computer 38 is searched, SEARCH COMMAND LIST 102. A decision, ERROR 104 is made as to whether or not the letters EL are on the command list. If there is an error, i.e. the letters EL are not on the command list, the sequence begins again with a new command word. If there is no error, i.e. the letters EL are on the command list, the sequence continues. An interrogating signal, ASK FOR ELEMENTS 116, representing data questions, is applied to teletype 48 via a computer 38. The operator selectively energizes keys 59 in such a manner as to enter responsive signals, ACCEPT SYMBOLS 118, into computer 38. Thereafter a decision, DONE 120, is made as to whether or not there are additional interrogating signals. If there are additional interrogating signals, the next interrogating signal and its responsive signal are generated. When the interrogating and responsive signals for this portion of the program have been completed, they are arranged in sequence, SORT 122, and ELEMENT SEQUENCE DATA 124 (ED) is entered into memory 46.

In the next portion of the FORMAT program, the operator selectively energizes keys 59 in such a manner that the command word FORMAT is printed on paper 65, ACCEPT A COMMAND 100, and the command list in computer 38 is searched SEARCH COMMAND LIST 102. A decision, ERROR 104 is made as to whether or not the letters FO are on the command list. If there is an error, i.e. the letters FO are not on the command list, the sequence begins again with a new command word. If there is no error, i.e. the letters FO are on the command list, the sequence continues. An interrogating signal, ASK FOR FORMAT 126 representing data questions are applied to teletype 48 via computer 38. The operator selectively energizes keys 59 in such a manner as to enter responsive signals, ACCEPT DATA 128 into computer 38. Thereafter a decision, DONE 130, is made as to whether or not there are additional interrogating signals. If there are additional interrogating signals the next interrogating signal and its responsive signal are generated. When the interrogating and responsive signals for this portion of the program have been completed, FORMAT DATA 132 (FD) is entered into memory 46.

In the next portion of the FORMAT program, the operator selectively energizes keys 59 in such a manner that the command word DOUBLE is printed on paper 65, ACCEPT A COMMAND 100, and the command list in computer 38 is searched SEARCH COMMAND LIST 102. A decision, ERROR 104, is made as to whether or not the letters DO are on the command list. If there is an error, i.e. the letters Do are not on the command list, the sequence begins again with a new command word. If there is no error, i.e. the letters DO are on the command list, the sequence continues. The recognized and accepted command signal operates to sequentially arrange the ED data, SORT 134. Thereafter, an interrogating signal ASK FOR DOUBLE LINE DATA 136, representing data questions are applied to teletype 48 via computer 38. The operator selectively energizes keys 59 in such a manner as to enter responsive signals, ACCEPT DATA 138, into computer 38. A decision, DONE 140, is made as to whether or not there are additional interrogating signals. If there are additional interrogating signals, the next interrogating signal and its responsive signal are generated. When the interrogating and responsive signals for this portion of the program have been completed, DOUBLE LINE DATA 142 (DD) is entered into memory 46.

In the next portion of the FORMAT program, the operator selectively energizes keys 59 in such a manner that the command word INTERFERENCE is printed on paper 65, ACCEPT A COMMAND 100, and the command list in computer 38 is searched, SEARCH COMMAND LIST 102. A decision, ERROR 104, is made as to whether or not the letters IN are on the command list. If there is an error, i.e. the letters IN are not on the command list, the sequence begins again with a new command word. If there is no error, i.e. the letters IN are on the command list, the sequence continues. An interrogating signal requesting CHECK VOLTAGE, ASK FOR CV 152, is applied to teletype 48 via computer 38. The operator selectively energizes keys 59 in such a manner as to enter a responsive signal ACCEPT CV 154 into computer 38. Thereafter, CHECK VOLTAGE DATA (CVD) is entered into memory 46.

In the next portion of the FORMAT program, the operator selectively energizes keys 59 in such a manner that the command word PUNCH is printed on paper 65, ACCEPT A COMMAND 100, and the command list in computer 38 is searched SEARCH COMMAND LIST 102. A decision ERROR 104 is made as to whether or not the letters PU are on the command list. If there is an error, i.e. the letters PU are not on the command list, the sequence begins again with a new command word. If there is no error, i.e. the letters PU are on the command list, the sequence continues. The recognized and accepted command signal PUNCH operates to have the FORMAT data, PUNCH ALL DATA TO TAPE 158, entered on a BINARY TAPE 160.

In the next portion of the FORMAT program, the operator selectively energizes keys 59 in such a manner that the command word END is printed on paper 65 ACCEPT A COMMAND 100, and the command list in computer 38 is searched SEARCH COMMAND LIST 102. A decision ERROR 104 is made as to whether or not the letters EN are on the command list. If there is an error, i.e. the letters EN are not on the command list, the sequence begins again with a new command word. If there is no error, i.e. the letters EN are on the command list, the sequence continues. The recognized and accepted command signal EN operates to enter the FORMAT data into a BINARY LOADER 162. In the illustrated embodiment, PUNCH ALL DATA TO TAPE 158, BINARY TAPE 160 and BINARY LOADER 162 are common to both the FORMAT and CALIBRATE program.

FORMAT MODE OF OPERATION

The operator selectively energizes keys 59 in such a manner that the word START is printed on paper 65, in consequence START command signals are applied to computer 38 and driver 68. The START command signal applied to computer 38 clears memory 46. In consequence of the START command signal being applied to driver 68, paper tape 70 is advanced and a series of interrogating signals representing question data are applied to teletype 48 via computer 38. These interrogating signals selectively energize keys 59, whereby "Number of fixed data characters" is printed on paper 65. The operator selectively energizes keys 59 and a numeral representing the number of fixed data characters desired is printed on paper 65 and a signal representing the number of fixed data characters desired is entered into memory 46. Thereafter, carriage return key 85 is depressed, in consequence carriage 64 is returned to the left margin and paper 65 is advanced on line. In addition, a command signal is applied to driver 68, whereby a series of interrogating signals representing question data from programmer 50 is applied to teletype 48 and "Number of elements" is printed on paper 65. In a manner similar to that previously described, the operator selectively energizes keys 59, in consequence a numeral representing the number of elements desired is printed on paper 65, a signal representing the number of elements desired is entered into memory 46, carriage 64 is returned to the left margin, and paper 65 is advanced one line. In the preferred embodiment of the invention the following series of four interrogating signals representing question data is generated by programmer 50:

a. Number of fixed data characters
b. Number of elements
c. Number of alloys
d. Time constant (of analog to digital converter 36)

As previously noted, the operator selectively energizes keys 59 for generating responsive signals representing answer data to each of the interrogating signals representing question data. That is, interrogating signals representing subsequent data questions are generated when responsive signals representing answer data for a previous data question have been entered into memory 46. After the last interrogating signal of the series is answered, the system waits for a secondary command of ACCEPT, CORRECT or REJECT. The ACCEPT command causes the information entered in memory 46 to be stored therein and the system awaits the next primary command signal. The CORRECT command generates the interrogating signal "number of the line to be corrected". After the operator enters the responsive signal specifying the line to be corrected into memory 46, the interrogating signals representing the specified line is repeated. The REJECT command erases all data entered into memory 46 and the series of interrogating signals are repeated. FIG. 2 illustrates the use of the ACCEPT, CORRECT, and REJECT commands signals.

The second step in the FORMAT mode is to enter into memory 46 the element symbols for all the alloys to be used. When a command signal for element symbols is given, interrogating signals representing the data question "if the symbols to be entered are an input sequence" is printed on paper 65. The operator types a "Y" for yes or an "N" for no. The input sequence is merely a list of the elements as they are read out from digital programmer 12, while the output sequence is used to specify the order in which the results are to be reported.

The second interrogating signal generated is "to what alloy these symbols are assigned". The alloy, or matrix number, is entered into memory 46 by selectively energizing keys 59 and then energizing carriage return key 85, whereby LN. NO. followed by a number is printed on paper 65. The operator responds with a two-character element symbol, or in the case of a one-character symbol, a space followed by the symbol. Note, in the illustrated embodiment, the system accepts two characters and then automatically asks for the next element symbol. This process is repeated for each spectrometer channel. When the system pauses, the operator must type ACCEPT, CORRECT, or REJECT as was done in the case of the START option.

The FORMAT command signal is used to create an individual output for each channel, whereby the operator is given complete control over the format of his report and the ability to select the channels he wishes to report under various conditions. FIG. 3 shows a sample FORMAT.

When a format command is given, a series of interrogating signals representing data questions requesting the number of the alloy or matrix is generated by programmer 50. When the operator has entered the appropriate number followed by a carriage return, a group of six interrogating signals representing format data questions are generated for each channel. As shown in FIG. 3, the first three interrogating signals require the operator to generate the responsive signals Y or N. The last three interrogating signals required numeric answers followed by a carriage return. After each group of six interrogating signals are generated, the system pauses for the entry of a secondary command ACCEPT, CORRECT or REJECT. In the FORMAT option, a REJECT command causes the entire format input for an alloy to be rejected. REJECT is used when an error has occurred that makes the entire series of entries wrong.

The six FORMAT interrogating signals are:

a. SUP. SYMBOL ?
  If the operator wishes to suppress the output of an identifying element symbol, the responsive signal to this interrogating signal is YES.
b. SUP. ELEMENT ?
  If the reading for this element is not desired, the responsive signal is answered YES.
c. TAB ?

If element supression is requested, but the space where the element would have printed is to be maintained, the responsive signal to this interrogating signal is YES.

d. LEVEL ?

Level indicates the priority of reporting.

e. TOTAL NO. OF DIGITS ?

The responsive signal to this interrogating signal determines the total number of digits to be printed for the present channel.

f. DIGITS AFTER DEC. PT ?

In conjunction with the previous question, the operator may specify the number of digits to be printed after the decimal point.

The system includes also a double spectrum line feature which provides the means to expand the dynamic range of concentration allowable for an element present in both trace and alloying concentrations by specifying the point at which the second of two spectrum lines is to be used. The system first requests the number of the alloy to which switchover values are to be assigned. The system then scans the element symbol list and types out the message, "SWITCHOVER for XX?", for each double line found. The responsive signal is the numeric value at which the second curve is to be used and is in the form of an element-to-matrix concentration ratio. Data for each line is entered into memory when the carriage return is struck.

The system includes also a check voltage feature which is used to enter a scaler number to monitor the check voltage channel. As in the case of the double line feature, the system generates interrogating signals for the alloy number and then the check voltage. The minimum check voltage is entered when the carriage return is struck.

Interference corrections may be used when an element (or elements) is being affected by one or more other elements. For example, if carbon is being influenced by aluminum and a correction of 0.0025 is specified, the current aluminum percentage times 0.0025 will be subtracted from the carbon percentage to correct for the influence of aluminum. In the illustrated embodiment, the system accepts up to six corrections with three interfering elements for each correction. In the case of an element that is interfered by fewer than three other lines, the correction specified for the unused lines is zero.

The first interrogating signal generated in the interference correction option is the number of the analytical curve set to which corrections apply. A valid alloy number is entered followed by a carriage return. The system then generates interrogating signals requesting the number of corrections. This is a number from one to six representing the number of lines being interfered by other lines. Each correction requested requires generation of response signals to each of the following interrogating signals:

a. CHANNEL INFLUENCED ?

This is the number of the channel being influenced by other lines. The operator must type in the channel number followed by a carriage return.

b. BY CHANNEL ?

This interrogating signal is generated three times to allow interferences from all possible interfering channels to be corrected. The operator must enter the channel number of the interfering line. In the case of a single interfering line, valid channel numbers must still by typed in response to the subsequent questions.

c. CORRECTION ?

This interrogating signal is generated for each channel and the operator enters the necessary corrections. Data is entered into memory 46 when the carriage return key is struck.

A punch option allows the operator to punch out a reloadable binary tape printer and reader 67 of the data he has entered through the FORMAT program. Preferably, the operator always exercises the PUNCH option after completing the data entry to preserve his results. In case of destruction of data, the tape output produced by this option may be reloaded and a minimum amount of time is lost in system restart. To use this option, the primary command PUNCH is entered, in consequence paper tape printer and reader 67 is readied. The system automatically computes the area to be punched, punches leader, data in binary format, trailer, and returns control to the system.

CALIBRATE PROGRAM FLOW CHART

Referring now to FIG. 8, the operator selectively energizes keys 59 in such a manner that the command word DISPLAY is printed on paper 65 ACCEPT A COMMAND 164 and a command list in computer 38 is searched SEARCH COMMAND LIST 166. A decision, ERROR 168 is made as to whether or not the letters DI are on the command list. If there is an error, i.e. the letters DI are not on the command list, the sequence begins again with a new command word. If there is no error, i.e. the letters DI are on the command list, the sequence continues. An interrogating signal, DISPLAY OPTIONS 170 representing data questions are applied to teletype 48 via computer 38. The operator selectively energizes keys 59 in such a manner as to enter responsive signals, ACCEPT AN OPTION 172, into computer 38. Thereafter a decision, DONE 174 is made as to whether or not there are additional interrogating signals. If there are additional interrogating signals, the next interrogating signal and its responsive signal are generated. When the interrogating and responsive signals for this portion of the program have been completed, the requested data is presented on paper 65, DISPLAY REQUESTED DATA 176 and on a printout 90, DISPLAY PRINTOUT 178.

In the next portion of the CALIBRATE program, the operator selectively energizes keys 59 in such a manner that the command word UPDATE is printed on paper 65, ACCEPT A COMMAND 164, and the command list in computer 38 is searched SEARCH COMMAND LIST 166. A decision, ERROR 168 is made as to whether or not the letters UP are on the command list. If there is an error, i.e. the letters UP are not on the command list, the sequence begins again with a new command word. If there is no error, i.e. the letters UP are on the command list, the sequence continues. An interrogating signal ASK FOR DATA 180, representing data questions are applied to teletype 48 via computer 38. The operator selectively energizes keys 59 in such a manner as to enter responsive signals ACCEPT DATA 182 into computer 38. The updated data is combined with the original data in MERGE 184. Thereafter, CALIBRATION DATA 186 (CD) is entered into memory 46.

In the next portion of the CALIBRATE program, the operator selectively energizes keys 59 in such a manner that the command word CALIBRATE is printed on paper 65, ACCEPT A COMMAND 164, and the command list in computer 38 is searched, SEARCH COMMAND LIST 166. A decision, ERROR 168, is made as to whether or not the letters CA are on the command list. If there is an error, i.e. the letters CA are not on the command list, the sequence begins again with a new command word. If there is no error, i.e. the letters CA are on the command list, the sequence continues. An interrogating signal, ASK FOP CURVE DATA 188, representing data questions are applied to teletype 48 via computer 38. The operator selectively energizes keys 59 in such a manner as to enter responsive signals ACCEPT DATA 190 into computer 38. Thereafter a decision, DONE 192, is made as to whether or not there are additional interrogating signals. If there are additional interrogating signals, the next interrogating signal and its responsive signal are generated. When the interrogating and responsive signals for this portion of the program have been completed, the program is directed sequentially to DO LEAST SQUARES FIT 194 and REPORT FIT 196. Thereafter, CALIBRATION DATA 198 (CD) is entered into memory 46.

In the next portion of the CALIBRATE program, the operator selectively energizes keys 59 in such a manner that the command word PUNCH is printed on paper 65, ACCEPT A COMMAND 164, and the command list in computer 38 is searched SEARCH COMMAND LIST 166. A decision ERROR 168 is made as to whether or not the letters PU are on the command list. If there is an error, i.e. the letters PU are on the command list, the sequence continues. The recognized and accepted command signal PUNCH operates to have the CALIBRATION data, PUNCH ALL DATA TO TAPE 158, entered on BINARY TAPE 160.

In the next portion of the CALIBRATE program, the operator selectively energizes keys 59 in such a manner that the command word END is printed on paper 65 ACCEPT A COMMAND 164, and the command list in computer 38 is searched SEARCH COMMAND LIST 166. A decision ERROR 168 is nade as to whether or not the letters EN are on the command list. If there is an error, i.e. the letters EN are not on the command list, the sequence begins again with a new command word. If there is no error, i.e. the letters EN are on the command list, the sequence continues. The recognized and accepted command signal EN operates to enter the CALIBRATE data into BINARY LOADER 162.

CALIBRATE MODE OF OPERATION

The CALIBRATE command signals activate the procedure for curve fitting and storage of the resulting coefficients for use by ANALYSIS programmer 54. The CALIBRATE function has three basic divisions: Identification, Data, and Evaluation. Programmer 52 generates a series of interrogating signals for report results and the operator, by selectively energizing keys 59, generates secondary command signals of ACCEPT, CORRECT, and REJECT, for editing input and for limited on-line manipulation of the analytical curve.

In response to a CALIBRATE command signal from teletype 48, programmer 52 generates the following interrogating signals representing question data in Identification:

a. ALLOY ?
 This identifies the analytical matrix for calibration. The operator enters the matrix number by selectively energizing keys 59 and then depressing carriage return key 85.

b. CHANNEL NUMBER ?
 The operator enters the number of the channel to be calibrated, followed by a carriage return. The channel number corresponds to the output sequence of digital programmer 12.

c. NUMBER OF SAMPLES ?
 This is the number of samples used to describe the analytical curve for this channel. The number of samples entry is terminated by a carriage return.

d. FOR BACKGROUND ?
 This is the number of samples to be used in the computation of the background coefficient. The entry must be equal to or less than the total number of samples and must be terminated with a carriage return.

e. STANDARD CLOCK READING ?
 The standard clock reading is a four-digit number which is obtained by burning the standardization block associated with this element. The analysis program uses this four-digit number as a reference in single point standardization. The standard clock reading entry is terminated with a carriage return.

f. STANDARD NUMBER ?
 The standard number is the number (1,2, or 3) assigned to the standardization block that provided the standard clock reading.

At the completion of Identification, the system waits for the operator to enter a secondary command. If the data entered is correct, the operator types ACCEPT and the system awaits data. Errors may be corrected by using the CORRECT command. The REJECT command causes the interrogating signals to be repeated until the operator uses the ACCEPT command.

When the operator has entered ACCEPT at the end of Identification, the system proceeds to Data. The first step requires that the element for calibration be identified by its element symbol. This symbol provides a checkpoint to verify the correspondence of channel number and element for the operator.

Programmer 52 generates a group of interrogating signals representing five data questions for each standard sample. These data questions will be repeated in paragraph form for each specified standard sample. Each data question will be preceded by a line number to simplify line identification for correction. All data answers must be numeric and must be terminated with a carriage return.

The five data questions for Data are:

a. SAMPLE NUMBER less than 2047?
 This may be any four digit number assigned to the standard sample for identification.

b. ELEMENT PERCENT ?
 This is the given percent concentration associated with this standard sample for the element being calibrated.

c. REFERENCE PERCENT ?
 The reference percent is the matrix percent concentration which may be computed for any standard sample by subtracting the sum of the trace element concentrations from 100.

d. CLOCK READING ?

The clock reading is the instrument scaler clock reading associated with this standard sample for this element.

e. BACKGROUND READING ?

The background reading is the scaler reading on the background channel coincident with the scaler clock reading used to answer question *d*.

When the system pauses again, the operator may correct errors by generating the CORRECT command from teletype 48. He may ACCEPT the entries, or he may REJECT the entire data section if a large number of errors is discovered. When the appropriate secondary commands have been used and the data is accepted, the system proceeds to Evaluation.

The data entered in Data may be evaluated with either a second or third other (two or three term) polynomial equation. Programmer 52 generates interrogating signals representing the data question "NO. OF COEFFICIENTS ?". The operator selects a two or three term solution by selectively energizing keys 59 and enters a 2 or 3 into memory 46. The operator then depresses carriage return key 85 and the system reports its evaluation of the data entered in Data. At the completion of the Evaluation, the system pauses and awaits a secondary command. If the operator finds the evaluation satisfactory, he types ACCEPT and the coefficients A, B, C, and D, and Standard Clock Reading Preset Standard Block No. will be stored as part of the data for the channel specified. The CORRECT command permits the operator to change the number of samples used in the evaluation, the number of samples used in the background computation, or the number of terms (order of the equation) used in evaluation. When the number of samples used is reduced, the highest concentration standard samples are deleted in order of concentration from the computation, but not from the core, so that they may be used at a later time. This correction process may be repeated as many times as necessary to find a good fit based on the data supplied. After the parameters are changed using the CORRECT command, the system re-evaluates the points. The REJECT command, when used at this point, signifies that this entire calibration is to be disregarded and the system will wait for a new primary command.

FIG. 4 shows the CALIBRATE command signals; for convenience, a dotted line is used to divide the figure into the three basic divisions, Identification, Data, and Evaluation.

An UPDATE option is used to store standard clock readings and standardization block numbers. The UPDATE command signal has several uses in the system. First, because coefficients for background and check voltage channels are not needed, these channels are never calibrated. Secondly, at some point it may become obvious that the standar block or standard block number assigned to a channel is no longer valid and that either or both numbers should be changed. The UPDATE command may be used for these changes without disturbing any of the other constants for the channel being updated.

When the UPDATE command is entered, the following interrogating signals representing data question are generated by programmer 52:

a. ALLOY ?

The number of the matrix or curve set is entered, followed by a carriage return.

b. CHANNEL NUMBER ?

The number of the channel in digital programmer 12 to be updated is entered, followed by a carriage return.

c. STANDARD CLOCK READING ?

The STANDARD CLOCK READING is discussed earlier in CALIBRATE, Identification (e).

d. STANDARD NUMBER ?

The STANDARD NUMBER is discussed earlier in CALIBRATE, Identification (f).

The data is immediately stored and no secondary command is used with this operation.

A unique feature of the CALIBRATE MODE is the DISPLAY command which allows the operator to examine the data he has stored, either channel-by-channel or matrix-by-matrix, using printout 90 which is connected to digital programmer 12. An alloy log (printout or an entire matrix) may be preserved for record-keeping purposes. In response to the DISPLAY command signal, programmer 52 generates the following interrogating signals:

a. ALLOY ?

The operator enters the matrix or alloy number to be displayed, followed by a carriage return.

b. ALLOY LOG ?

If the data answer to this data, question is YES (a Y is typed), the system proceeds with a full printout. If the operator answers NO (N), the system instructs him to TYPE A FOR EL, B FOR SV. The operator's choice of A or B will depend whether he wants the values for an element or a switchover value. If the operator types A, programmer 52 generates signals representing the data question "CHANNEL ?". As soon as the channel is indicated, computer 38 generates a series of signals to printout 90, whereby the appropriate information is printed. If the operator types B, elements having switchover values and the value are printed.

ANALYSIS PROGRAM FLOW CHART

Now referring to the ANALYSIS program flow chart illustrated in FIG. 9, it will be seen at 200 that the START DATA FORMAT is extracted and is prepared for further use as shown at CLEAR AND INITIALIZE 202. The data is then processed in WAITING LOOP 204. INTERRUPT at 206 from digital programmer 12 and data in the WAITING LOOP at 204 input ACCEPT DATA 208. Thereafter, the data in ACCEPT DATA 208 is processed in CONVERT TO INTERNAL CODE 210. CHECK VOLTAGE DATA (CVD) is extracted at 212 and is processed at 214. CALIBRATION DATA (CD) is extracted at 216 and PERCENT CALCULATION is processed at 218. DOUBLE LINE DATA (DD) is extracted at 220 and is processed at 222. INTERFERENCE DATA (ID) is extracted at 224 and is processed at 226. ELEMENT SEQUENCE DATA (ED) is extracted at 228 and is arranged at SORT ED 230. FORMAT DATA is extracted at 232 and is displayed at REPORT ANALYSIS 234.

ANALYSIS MODE OF OPERATION

ANALYSIS programmer 54 is the operating program. Under the control of ANALYSIS programmer 54, the computer receives and operates on the data from the digital programmer 12. ANALYSIS programmer 54 operates in three modes: Scaler, Standardization, and Percent Concentration.

When ANALYSIS programmer 54 is energized, control is transferred to digital programmer 12. The operator energizes an ADVANCE button 92, whereby fixed data is entered into memory 46. The operator selects not only the function to be performed, but also the alloy (analytical curve set) to be used. Fixed data is entered through thumbwheel switches 94 and computer control buttons 96 on digital programmer 12. The first two thumbwheel switches and the computer control buttons are used to program control and data selection. The remaining thumbwheel switches may be used for sample identification or any other form of identification. In scaler mode the system reports instrument readings (clock numbers).

In order to standardize the system, it is necessary to burn the standardizing sample or samples. The printout for each exposure is the difference between the standard clock reading (stored during calibration) and the reading just obtained. These differences are reported for only the channels associated with the standardizing block being analyzed. All element symbols are printed and spaces replace readings for channels assigned to other standardizing blocks.

Several criteria may be stated for choosing standardizing blocks and for assigning elements to a block. First, and most important, any material chosen for a standardizing block must be very homogeneous. It must be available in quantity. It must contain as many elements at average concentration levels as possible. The main requirement for assigning an element to a specific standardizing block is that a clock reading near the average, to be obtained during analysis for that element, be obtained from the block. For example, there is no reason why an iron-based standardizing block could not be used for the same elements in copper, aluminum, and steel matrices provided this criterion is met. This type of operation is possible since the computer does not make a direct comparison between standardizing block and unknown sample. The computer positions a previously obtained calibration curve with the standard block, but obtains the actual concentrations from the standards used to make the calibration curve.

With a fully calibrated and standardized system, the operator may proceed to the Percent Concentration mode in ANALYSIS. In this mode, the system makes full use of the format specifications, reporting selected elements to a predetermined number of decimal places. Matrix dilution and non-matrix dilution calculations are selected and reported. An example of percent concentration output is shown in FIG. 5.

The non-matrix dilution calculation is made assuming that the matrix element, for example, iron in steel, or aluminum in aluminum alloy, is either nearly 100 percent of the material or, in a high alloy, is at a nearly constant concentration. Preferably, non-matrix dilution calculation of concentration is used with low alloy materials and with a specific high alloy type.

The matrix dilution calculation is used when the matrix element may occur in substantially different concentrations in the different materials to be analyzed. It will tend to reduce the required number of analytical curve sets required to cover a wide range of materials. Calibration for matrix dilution is done for analytical curves plotted with the ratio of element concentration to matrix concentration versus scaler clock readings.

The matrix concentration is calculated after all unknown element ratios have been determined by using the equation:

$$M = 100/(1 + \Sigma_i Z_i)$$

where $M$ = matrix concentration in percent $$Z_i = \frac{C_i}{M} = \frac{\text{Concentration in percent } i\text{th element}}{\text{Matrix concentration in percent}}$$

The $Z_i$ values are then multiplied by M to obtain the values of $C_i$, which are reported together with the value for M.

It is important to note the following:

1. Non-matrix-dilution calibration is done in terms of a matrix concentration set equal to 100 percent.
2. Matrix-dilution calibration is done in terms of concentration ratios. The CALIBRATE program will compute these ratios from the element and actual matrix concentrations entered.
3. Matrix-dilution calculations require that correct results be obtained for all elements. A large error in one element concentration means that all results will be erroneous.
4. It is not possible to analyze a sample in matrix-dilution mode if the original calibration was done with non-matrix-dilution and vice versa.

Since certain changes may be made in the foregoing disclosure without departing from the scope of the invention herein involved, it is intended that all matter contained herein be construed in an illustrative and not in a limiting sense.

What is claimed is:

1. A system for chemical analysis of a specimen comprising:

a. optical emission spectrometer means for generating first signals representing specimen data;

b. logarithmic converter means operatively connected to said spectrometer means for generating second signals logarithmically related to said first signals;

c. computer means operatively connected to said converter means for generating third signals defining an analytical curve related to trace element concentration versus the logarithm of said second signals;

d. format programmer means operatively connected to said computer means for generating fourth signals which are applied to said computer means for establishing initial conditions;

e. calibrate programmer means operatively connected to said computer means for generating fifth signals which are applied to said computer means for calibrating an equation for fitting said analytical curve;

f. analysis programmer means operatively connected to said computer means for generating sixth signals which are applied to said computer means for performing percent concentration calculations, standardization, and scaler output operations of raw spectrometer means data;

g. stored program means operatively connected to said computer means, said format programmer means, said calibrate programmer means and said analysis programmer means interacting with said computer means under the direction of said stored program means; and h. manually operated control means operatively connected to said computer means for generating seventh signals which selectively control said fourth, fifth and sixth signals generated respectively by said format, calibrate and analysis programmer means, operation of said system being governed by said manually operated control means.

2. The system as claimed in claim 1 wherein each said format, calibrate and analysis programmer means includes:

a. driver means operatively connected to said computer means, said driver means responsive to said seventh signals generated by said manually operated control means;

b. memory core means operatively connected to said driver means for storing data; and c. sensor means operatively connected to said memory core means and said computer means for selectively feeding said stored data to said computer means.

3. The system as claimed in claim 2 wherein said fourth, fifth and sixth signals include interrogating signals representing data questions from said format, calibrate and analysis programmer means, respectively.

4. The system as claimed in claim 3 wherein said manually operated control means includes:

a. keyboard means operatively connected to said computer means for genrating command and response signals; and b. indicator means operatively connected to said keyboard means for presenting said interrogating, command and response signals.

5. A system for chemical analysis of a specimen comprising:

a. spectrometer means for generating specimen signals representing specific trace elements of said specimen and a reference signal representing the amount of specimen material analyzed by said spectrometer means;

b. converter-control means operatively connected to said spectrometer means for controlling said spectrometer means, said element and reference signals being applied to said converter-control means, the signals at the output of said converter-control means being an analytical working curve plotted as element concentration versus the logarithm of the ratio of the element signal to the reference signals;

c. computer means electricall connected to said converter-control means, said converter-control means being responsive to the signals as at the output of said computer means, said analytical working curve being applied to said computer means for processing;

d. format programmer means operatively connected to said computer means for generating first signals for establishing initial conditions;

e. calibrate programmer means operatively connected to said computer means for generating second signals for calibrating an equation for fitting said analytical curve;

f. analysis programmer means operatively connected to said computer means for generating third signals for initiating percent concentration calculation signals;

g. stored program means operatively connected to said computer means, said format programmer means, said calibrate programmer means and said analysis programmer means interacting with said computer means under the direction of said stored program means; and h. manually operated control means operatively connected to said computer means for generating fourth signals which selectively control said first, second and third signals generated by said format, calibrate and analysis programmer means.

6. The system as claimed in claim 5 wherein each said format, calibrate and analysis programmer means includes:

a. driver means operatively connected to said computer means, said driver means responsive to said fourth signals generated by said manually operated control means;

b. memory core means operatively connected to said driver means for storing data; and c. sensor means operatively connected to said memory core means and said computer means for selectively feeding said stored data to said computer means.

7. The system as claimed in claim 6 wherein said first, second and third signals include interrogating signals representing data questions from said format, calibrate and analysis programmer means, respectively.

8. The system as claimed in claim 7 wherein said manually operated control means includes:

a. keyboard means operatively connected to said computer means for generating command and response signals; and b. indicator means operatively connected to said keyboard means for presenting said interrogating command and response signals.

9. A system for chemical analysis of a specimen comprising:

a. spectrometer means for generating specimen data signals;

b. converter-control means operatively connected to said spectrometer means for controlling said spectrometer means, said specimen data signals being applied to said converter-control means;

c. computer means electrically connected to said converter-control means, said converter-control means being responsive to the signals generated by said computer means;

d. format programmer means operatively connected to said computer means for generating first signals for establishing initial conditions;

e. calibrate programmer means operatively connected to said computer means for generating second signals for calibrating said specimen data signals;

f. analysis programmer means operatively connected to said computer means for generating third signals for analyzing said specimen data signals;

g. stored program means operatively connected to said computer means; said format programmer means, said calibrate programmer means and said analysis programmer means interacting with said computer means under the direction of said stored program means; and h. manually operated control means operatively connected to said computer means for generating fourth signals which selectively control said first, second and third signals generated by said format, calibrate and analysis programmer means.

* * * * *